United States Patent Office 3,809,654
Patented May 7, 1974

---

3,809,654
METHODS OF SCALE INHIBITION
Robert S. Mitchell, Webster Groves, Mo., assignor to Monsanto Company, St. Louis, Mo.
No Drawing. Filed May 17, 1972, Ser. No. 254,246
Int. Cl. C02b 5/06
U.S. Cl. 252—180               26 Claims

ABSTRACT OF THE DISCLOSURE

The precipitation of scale-forming salts in an aqueous system is inhibited by adding either stoichiometric or substoichiometric amounts to said system of substituted diamines of the general formula

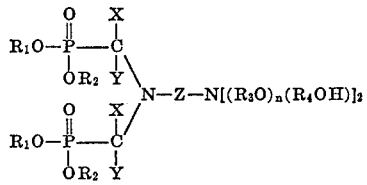

wherein $R_1$, $R_2$, $R_3$, $R_4$, X, Y and Z are hereinafter defined and $n$ is 0–10.

---

This invention relates to methods for inhibiting the precipitation of metal ions from aqueous solutions, and more particularly, to the use of certain substituted diamines to accomplish this purpose.

Most commercial water contains ion and alkaline earth metal cations, such as calcium, barium, magnesium, etc., and several anions such as hydroxide, bicarbonate, carbonate, sulfate, oxalate, phosphate, silicate, fluoride, etc. When combinations of these anions and cations are present in concentrations which exceed the solubility of their reaction products under the conditions of the application (i.e., use), precipitates form until their reaction solubility product concentrations are no longer exceeded. For example, when the concentrations of calcium ion and sulfate ion exceed the solubility of the calcium sulfate, a solid phase of calcium sulfate will form.

Solubility product concentrations are exceeded for various reasons, such as evaporation of the water phase, change in pH, pressure or temperature, and the introduction of additional ions which form insoluble compounds with the ions already present in the solution.

As these reaction products precipitate on the surfaces of the water carrying system, they form scale. The scale prevents effective heat transfer, interferes with fluid flow, facilitates corrosive processes, and harbors bacteria. The presence of this scale is an expensive problem in many industrial water systems (e.g., boilers, cooling towers, evaporators, etc.), oil wells, and the like, causing delays and shutdowns for cleaning and removal.

Scale-forming compounds can be prevented from precipitating by inactivating their cations with chelating or sequestering agents, so that the solubility of their reaction products is not exceeded. Generally, this requires many times as much chelating or sequestering agent as cation, and these amounts under certain conditions are not always desirable or economical.

More than twenty-five years ago it was discovered that certain inorganic polyphosphates would prevent such precipitation when added in amounts less than the concentrations needed for sequestering or chelating. See, for example. Hatch and Rice, "Industrial Engineering Chemistry," vol. 31, pages 51 and 53; Reitmeier and Buehrer, "Journal of Physical Chemistry," vol. 44, No. 5, pages 535 and 536 (May 1940); Fink and Richardson U.S. Pat. 2,358,222; and Hatch U.S. Pat. 2,539,305, all of which are incorporated herein by reference. For sequestration, the mole ratio of precipitation inhibitor equivalents to scale forming cation is usually 1:1 or greater (2:1, 3:1, etc.). These ratios are referred to as stoichiometric. Substoichiometric amounts would include all mole ratios of precipitation inhibitor equivalent to scale forming cation that are less than the level required for sequestration; this phenomenon is known in the water treating art as the "threshold" effect.

It is to be understood that term "threshold" as utilized herein refers to the chemical and/or physical phenomenon that less than stoichiometric quantities of the particular precipitation inhibitor can effectively prevent the precipitation of various metallic ions such as calcium, iron, copper and cobalt and/or alter those crystals formed such that the adherence to surfaces is substantially reduced. In other words, the "threshold" treatment of water is that technique by means of which less than stoichiometric quantities of the treating agent are added to interfere with the growth of crystal nuclei and thereby prevent the deposition of insoluble deposits.

Consequently, precipitation inhibitors which function as a threshold agent and a sequestering agent represent an advancement in the art and are in substantial demand.

Therefore, an object of this invention is to provide a method for inhibiting the precipitation of metal ions from aqueous solutions.

Another object of this invention is to provide a precipitation inhibitor which is effective in inhibiting the precipitation of metal ions in acid or alkaline aqueous solutions.

A still further object of this invention is to provide a precipitation inhibitor which is effective in inhibiting the precipitation of iron ions and calcium ions in acid or alkaline solutions.

Other objects will become apparent from a reading of the following detailed description.

It has been found that certain substituted diamines corresponding to the following formula (I)
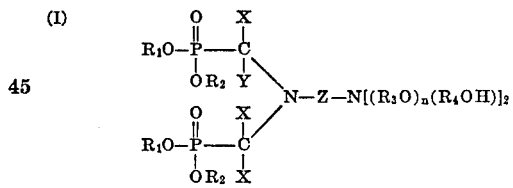

unexpectedly function as superior precipitation inhibitors when used in substoichiometric concentrations. The phenomenon includes what is generally known in the art as the "threshold effect." Furthermore, these substituted diamines function as sequestering agents where one so desires to use the same.

In Formula I, above, $R_1$ and $R_2$ can be alike or unlike and are from the group metal ions and hydrogen. The aforementioned metal ions are from the group metals which includes, without limitation, alkali metals such as sodium, lithium and potassium; alkaline earth metals, such as calcium and magnesium; aluminum; zinc; cadmium; manganese; nickel; cobalt; cerium; lead; tin; iron; chromium; copper; gold; and mercury. Also included are the amines such as ammonium ions and alkyl ammonium ions. In particular, those alkyl ammonium ions derived from amines having a low molecular weight, such as below about 300, and more particularly the alkyl amines, alkylene amines, and alkanol amines containing not more than two amine groups, such as ethyl amine, diethyl amine, propyl amine, propylene diamine, hexyl amine, 2-ethyl-hexylamine, N-butylethanol amine, triethanol amine, and the like, are the preferred amines. It is within the scope of the present invention to include amines, such as those described in U.S. 3,613,788 and U.S. 3,619,427 (which are incorporated herein by reference) in order to provide the amine salts of said substituted diamines. It is to be understood that the preferred metal ions are those which render the compound a water-soluble salt in concentrations sufficient for the desired applications.

In Formula I above, $R_3$ and $R_4$ are alike or unlike and are each independently an alkyl group containing from two (2) to five (5), preferably two (2) to three (3) carbon atoms. Examples of such alkyl groups include, without limitation, ethyl, propyl, buytl and the like.

In Formula I above, X and Y are each alike or unlike and are from the group hydrogen and organic radicals such as alkyl containing less than 40, preferably 1 to 4, carbon atoms. It is to be understood that organic radicals such as other aliphatic groups and also aromatic groups are included herein. X and Y are preferably hydrogen.

In Formula I, Z is a hydrocarbon group containing from 2 to 15 carbon atoms and includes (a) normal or straight chain carbon groups, e.g. $(CH_2)_2$ to $(CH_2)_{15}$, (b) branched chain carbon groups, e.g. $-CH_2CH_2CH_2-$, and (c) cyclic carbon groups, e.g.

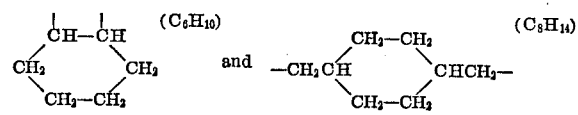

In Formula I, n has a value of from 0 through 10 (preferably 0-3). Is is to be understood that all of the compounds falling within the above Formula I and as heretofore defined are generically described herein as "substituted diamines" or SDA. In other words, then, the acids and salts and physical and chemical mixtures thereof are all generically described herein as "substituted diamines" or "SDA."

Illustrative (but without limitation) of some of the present invention SDA are shown below:

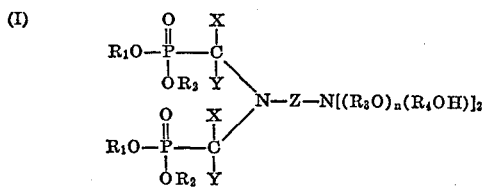

| Compound No. | $R_1$ | $R_2$ | $R_3$ | $R_4$ | X | Y | n | Z |
|---|---|---|---|---|---|---|---|---|
| 1 | H | H | | $C_2H_4$ | H | H | 0 | $(CH_2)_3$ |
| 2 | H | H | | $C_2H_4$ | H | H | 0 | $(CH_2)_3$ |
| 3 | H | Na | | $C_2H_4$ | H | H | 0 | $(CH_2)_3$ |
| 4 | H | Zn | | $C_2H_4$ | H | H | 0 | $(CH_2)_3$ |
| 5 | H | $NH_4$ | | $C_2H_4$ | H | H | 0 | $(CH_2)_3$ |
| 6 | H | H | $C_2H_4$ | $C_2H_4$ | H | H | 1 | $(CH_2)_3$ |
| 7 | H | H | $C_2H_4$ | $C_2H_4$ | H | H | 5 | $(CH_2)_3$ |
| 8 | H | H | $C_2H_4$ | $C_2H_4$ | H | H | 10 | $(CH_2)_3$ |
| 9 | H | H | $C_3H_6$ | $C_3H_6$ | H | H | 1 | $(CH_2)_3$ |
| 10 | H | Na | $C_3H_6$ | $C_3H_6$ | H | H | 1 | $(CH_2)_3$ |
| 11 | H | H | $C_3H_6$ | $C_3H_6$ | H | H | 5 | $(CH_2)_3$ |
| 12 | H | H | $C_2H_4$ | $C_3H_6$ | H | H | 1 | $(CH_2)_3$ |
| 13 | H | H | $C_2H_4$ | $C_3H_6$ | H | H | 5 | $(CH_2)_3$ |
| 14 | Na | H | $C_2H_4$ | $C_3H_6$ | H | H | 1 | $(CH_2)_3$ |
| 15 | Cu | Cu | $C_2H_4$ | $C_2H_4$ | H | H | 3 | $(CH_2)_3$ |
| 16 | H | H | | $C_2H_4$ | $CH_3$ | H | 0 | $(CH_2)_3$ |
| 17 | H | H | | $C_2H_4$ | $CH_3$ | $CH_3$ | 0 | $(CH_2)_3$ |
| 18 | H | H | | $C_3H_6$ | H | H | 0 | $(CH_2)_3$ |
| 19 | H | H | | $C_2H_4$ | H | H | 0 | $(CH_2)_2$ |
| 20 | H | H | | $C_2H_4$ | H | H | 0 | $(CH_2)_4$ |
| 21 | H | H | | $C_2H_4$ | H | H | 0 | $(CH_2)_5$ |
| 22 | H | H | | $C_2H_4$ | H | H | 0 | $(CH_2)_6$ |
| 23 | H | H | | $C_2H_4$ | H | H | 0 | $C_6H_{10}$ |
| 24 | H | H | | $C_2H_4$ | H | H | 0 | $C_8H_{14}$ |

The SDA falling within the aforegoing Formula I are prepared according to my copending patent application filed concurrently herewith and which is incorporated herein by reference.

The precipitation inhibitors of the present invention have utility whenever it is desired to inhibit the precipitation of metal ions from aqueous solutions (and/or alter those crystals formed such that the adherence to surfaces is substantially reduced and/or exhibit control of metal ions through chelation in aqueous systems even when precipitation is not a dominant problem). Typical applications also include liquid soaps and shampoos (e.g., note U.S. 3,313,735); bar soaps; scouring wool cloth; cotton kier boiling; cotton dyeing; cotton bleaching; metal cleaning compounds; rubber and plastic trace metal contamination (compounding and polymerization); pulp and paper trace metal contamination; saline water (e.g., note U.S. 3,505,238); oral compositions as anticalculis agents (e.g. note U.S. 3,488,419, U.S. 3,535,420 and U.S. 3,535,421); photographic developers (e.g., note U.S. 3,201,246); hair bleaching and dyeing operations (e.g., note U.S. 3,202,579); stabilizing hydrogen peroxioxide solution (e.g., note U.S. 3,383,174 and 3,234,140); brine solutions (e.g., note U.S. 3,385,675); brackish water; and squeeze treatment of producing oil wells (e.g., note U.S. 3,483,925). All of the above patents are incorporated herein by reference.

The amount of the precipitation inhibitor necessary to be effective varies with, inter alia, the type and amount of problem metal ions, pH conditions, temperature and the like. When using substiochiometric amounts, the preferred mole ratio of the precipitation inhibitor to the scale forming cation salt is from about 1:1.5 to about 1:10,000 with the concentration of precipitation inhibitor in the system being generally from about 0.1 to 500 parts per million. When using sequestering amounts, i.e. at least stoichiometric quantities, the preferred mole ratio is from about 1:1 to 2.5:1.

It is within the scope of the present invention that the precipitation inhibitors of the present invention may also be used in aqueous sysems which contain inorganic and/or organic materials (particularly, all ingredients or substances used by the water-treating industry), with the provision that such materials do not render the precipitation inhibitors substantially ineffective for their end purpose.

These organic and inorganic materials include those ingredients or compositions described and disclosed in the United States patents heretofore set forth. Such materials also include, without limitation, polycarboxylates, particularly those whose molecular weights are from about 2 to about 20,000 (e.g., note U.S. 3,514,376 which is incorporated herein by reference) and from about 20,000 to about 960,000 (e.g., note U.S. 3,293,150 which is incorporated herein by reference); anti-foam agents; water soluble polymers; tannins; lignins; de-aerating materials; polymeric anhydrides (such as polymaleic anhydride); and sulfonated lignins. In addition, water-soluble inorganic chromates such as those described in U.S. 3,431,217 (which is incorporated herein by reference) may be used in combination with said inhibitors. Other materials which can be used with said precipitation inhibitors include, for example, surface active agents and corrosion inhibitors such as those described in Corrosion Inhibitors, by Beegman, published by MacMillan in 1963; U.S. 3,483,153 and U.S. 3,532,639, all of which are incorporated herein by reference. Furthermore, other precipitation inhibitors such as amino tri(methylene phosphonic acid) may be used in combination with the precipitation inhibitors of the present invention. For exemplary purposes only, these other precipitation inhibitors are described in U.S. 2,970,959; U.S. 3,234,124; U.S. 3,336,221; U.S. 3,393,150; U.S. 3,400,078; U.S. 3,400,148; U.S. 3,434,969; U.S. 3,451,939, U.S. 3,462,365; and U.S. 3,619,427, all of which publications are incorporated herein by reference.

The following examples are included to illustrate the practice of the present invention and the advantages provided thereby but are not to be considered limiting. Unless otherwise specified, all parts are parts by weight and all temperatures are in degrees centigrade.

EXAMPLE I

In order to demonstrate the sequestering ability of the substituted diamines, SDA, falling within Formula I above, the compounds identified above as Nos. 1 through 24 are subjected to the sequestration procedure described in the book Coordination Chemistry, "Calcium Complexing by Phosphorus Compounds," by C. F. Callis, A. F. Kerst and J. W. Lyons, pages 223–240, Plenum Press, 1969.

Approximately 1 gram of each of the above described compounds (SDA—"sequestration agents") is individually and separately mixed with 0.1% by weight sodium oxalate in a 2-liter flask containing 100 milliliters of water. The pH in each case is adjusted by the addition of sodium hydroxide to a pH 11. Into each solution containing the separate and individual sequestration agents there is titrated a 0.1 molar calcium nitrate solution via the use of a Sargent-Malmstadt automatic titrator, Model SE, and which also measures the turbidity by light transmission. The amount of calcium nitrate solution added to each flask is sufficient to provide ample data to plot the point of inflection at which the sequestrant-containing solution goes from a relatively clear solution to a turbid one. This inflection point is then indicative of the amount of calcium that is sequestered by the particular sequestration agent.

The results of the sequestration test on Compounds Nos. 1 through 24 show that the various substituted diamines are effective sequestrants for calcium which is one of the major undesirable cations in water which is used, for example, in cooling towers. Specifically, it is found that 100 grams of the above-described Compound No. 1 sequesters at least 1.5 grams of calcium. It is also found that the other SDA Compounds Nos. 2 through 24 sequester calcium in the range of from about 0.1 gram to about 5.0 grams of calcium per 100 grams of the SDA.

EXAMPLE II

The following example is carried out illustrating the iron sequestering ability of the SDA.

The testing procedure consists of pipetting an aliquot volume of 2.5% ferric chloride solution into a beaker and adding thereto enough sodium hydroxide or hydrochloric acid to give the desired pH. The solution is stirred for fifteen minutes, followed by the addition of an aliquot of 2.5% of the sequestering agent solution, i.e., the particular SDA dissolved in water. After final pH adjustment with sodium hydroxide or hydrochloric acid, the solution is shaken for 48 hours to reach equilibrium. The solution is then centrifuged at about 12,000 r.p.m. for approximately 55 minutes to remove colloidal ferric hydroxide and an aliquot of the supernatant solution is titrated iodometrically or analyzed by X-ray fluorescence with use of an appropriate calibration curve in order to determine the ferric iron concentration. The ferric iron concentrations and sequestering agent concentrations found in parts per million (p.p.m.) are converted to a weight basis and expressed as pounds of iron sequestered by 100 pounds of sequestering agent.

Following the above described procedure, each of the Compounds Nos. 1 through 24 heretofore described is individually tested. In each case it is found that the precipitation inhibitors of the instant invention demonstrate an unexpected and unique ability to sequester ferric iron over a wide range of pH conditions, i.e., from about 4 to about 10.5, and that the average amount (in pounds) of iron sequestered by 100 pounds of the respective precipitation inhibitor (compound number) over the 4 to 10.5 pH range is, in each case, at least 3 pounds of iron (III).

EXAMPLE III

The above Example II is repeated several times with the exception that other metal ion-containing solutions such as calcium, copper, nickel and chromium are utilized in place of the ferric (chloride) solution. In each case utilizing the aforementioned compounds the average sequestration values of these latter mentioned ions respectively are found to be similar to those set forth above.

Example II is again repeated several times, utilizing as a sequestering agent trisodium nitrilo triacetate·$2H_2O$, sodium citrate, and potassium gluconate. It is found that the pounds of iron sequestered by 100 pounds of the aforementioned sequestering agents respectively are 7.0, 6.5 and 2.9 over the same pH range of 4 to 10.5. It can readily be seen, then, that the SDA (in the acid or salt forms) of the present invention, when utilized as sequestering agents are equally as effective as the widely used organic sequestering agents under comparative conditions and in some cases are superior thereto. Furthermore, when such SDA of the present invention are utilized as sequestering agents, they exhibit an effectiveness as such over a wide range of pH conditions. This is highly advantageous in permitting their respective use in many and varied applications.

EXAMPLE IV

The present invention SDA falling within Formula I also exhibit threshold properties, i.e., they can be utilized in less than stoichiometric quantities to prevent the precipitation of salts of mineral acids, such as $CaCO_3$, in aqueous system. Specifically, a test is conducted in which each of the compounds, i.e., Nos. 1 through 24, is separately and independently mixed at 25° with 250 milliliters of water containing $CaCl_2$. To the resultant mixture is added $NaHCO_3$. The pH in each case is adjusted to 7 and maintained thereat with sufficient NaOH or HCl. The amounts of $CaCl_2$, $NaHCO_3$ and inhibiting agent used are sufficient to provide 5000 p.p.m. of $CaCO_3$ and 10 p.p.m. of the indicated SDA (precipitation inhibitor). It is observed in each case that these less than stoichiometric quantities of said precipitation inhibitors (threshold agents) effect a substantially clear solution for a period of at least 48 hours. Stating the results in a different manner, 10 parts per million of the indicated SDA (threshold agent) is effective in providing a clear solution without precipitation which contains substantially greater than stoichiometric quantities of calcium carbonate therein.

EXAMPLE V

The above Example IV is repeated several times with the concentration of the specific SDA additive being respectively 25 p.p.m., 100 p.p.m., 200 p.p.m. and 500 p.p.m. The results utilizing these different concentrations than that set forth in Example IV are similar to the results obtained in Example I.

EXAMPLE VI

A solution is prepared in order to demonstrate the "threshold effect" of only 5 parts of aminopropyldiethanolamine di(methyl phosphonic acid)-(Compound No. 1) per 1,000,000 parts of solution containing large quantities of $CaSO_4$. (The 5 p.p.m. is based on a 100% active phosphonic acid basis.) The solution is prepared by dissolving the appropriate amount of said acid in water and then adding calcium chloride following by the addition of sodium sulfate. The amounts of sodium sulfate and calcium chloride used are sufficient to result in the solution containing 10,000 p.p.m. of $CaSO_4$ and then the pH is adjusted to 7. The solution is stored with continuous agitation (NBS Gyrotory Shaker) at 25° C. A "control" solution is prepared in the same manner as the test solution except that the "control solution" does not contain any of the threshold agent—i.e., said phosphonic acid.

These tests show that the "control" solution (10,000 p.p.m. $CaSO_4$) within a few minutes after preparation each result in the precipitation of CaSO$_4$. However, in the test solution which contains said (phosphonic acid), the solution per se remains clear over an extended period of at least 10 days at the 10,000 p.p.m. CaSO$_4$ level. At the end of the aforementioned 10 day period, the test solution is clear to visual observation and 100% of all the CaSO$_4$ remains in solution as further determined by titration of a sample of each solution with a standard solution of ethylene diamine tetraacetic acid using an Eriochrome Black T indicator.

The foregoing examples have been described in the foregoing specification for the purpose of illustration and not limitation. Many other modifications and ramifications will naturally suggest themselves to those skilled in the art based on this disclosure. These are intended to be comprehended as within the scope of this invention.

What is claimed is:

1. A method of inhibiting the precipitation of scale-forming salts in an aqueous system comprising adding at least a precipitating inhibition amount of a substituted diamine having the general formula

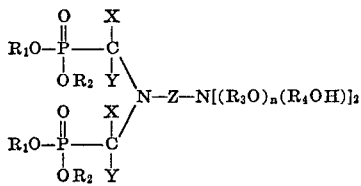

wherein (a) R$_1$ and R$_2$ are alike or unlike and are selected from the group consisting of hydrogen, metal ions, and amine groups; (b) R$_3$ and R$_4$ are alike or unlike and are each independently an alkyl group containing from about 2 to about 5 carbon atoms; (c) $n$ is an integer having a value of from about 0 to about 10; (d) X and Y are each alike or unlike and are selected from the group consisting of hydrogen and C$_{1-40}$ alkyl; and (e) Z is a saturated hydrocarbon group containing 2 to 15 carbon atoms selected from the group consisting of straight chain, branched chain and cyclic carbon groups.

2. The method of claim 1 wherein the scale-forming salt is alkaline earth metal carbonates, sulfates, oxalates, phosphates, fluorides or silicates.

3. The method of claim 1 wherein the mole ratio of precipitation inhibitor to scale-forming salts is from about 1 to 1.5 to about 1 to 10,000.

4. The method of claim 3 wherein the precipitation inhibitor is present in the system at concentrations from about 0.1 part per million to about 500 parts per million.

5. The method as set forth in claim 1 wherein X and Y both are hydrogen.

6. The method as set forth in claim 1 wherein R$_1$ and R$_2$ are each hydrogen.

7. The method as set forth in claim 1 wherein R$_1$ and R$_2$ are a metal ion selected from the group consisting of alkali metals, alkaline earth metals, ammonia, zinc, cadmium, magnesium, and aluminum.

8. The method as set forth in claim 1 wherein the aqueous system contains a water-soluble chromate.

9. The method as set forth in claim 1 wherein the aqueous system contains a water-soluble polycarboxylate having a molecular weight of from about 2 to about 960,000.

10. The method as set forth in claim 1 wherein the scale-forming salt is an iron hydroxide.

11. The method as set forth in claim 1 wherein the scale-forming salt is magnesium hydroxide.

12. The method of claim 1 wherein said diamine has the formula

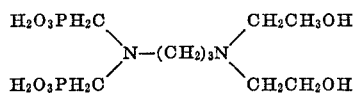

13. The method of claim 1 wherein said diamine has the formula

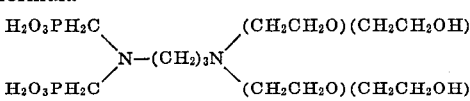

14. The method of claim 1 wherein said diamine has the formula

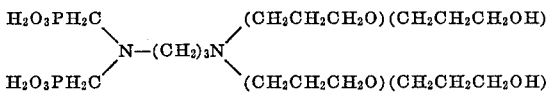

15. The method of claim 1 wherein said diamine has the formula

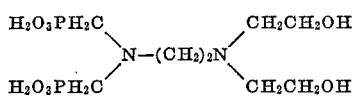

16. The method of claim 1 wherein said diamine has the formula

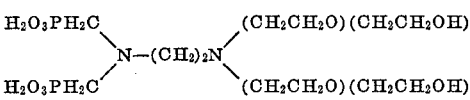

17. The method of claim 1 wherein said diamine has the formula

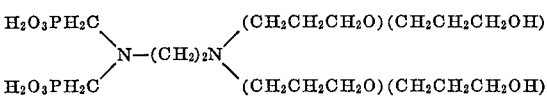

18. The method of claim 1 wherein said diamine has the formula

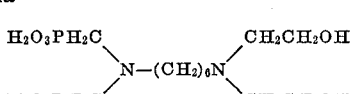

19. The method of claim 1 wherein said diamine has the formula

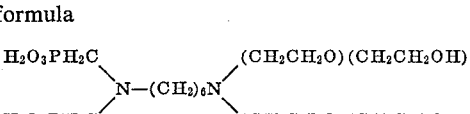

20. The method of claim 1 wherein said diamine has the formula

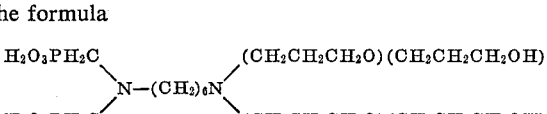

21. The method of claim 1 wherein said diamine has the formula

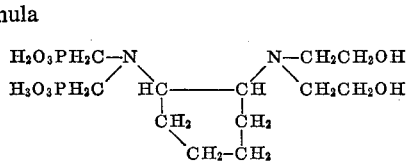

22. The method of claim 1 wherein said diamine has the formula

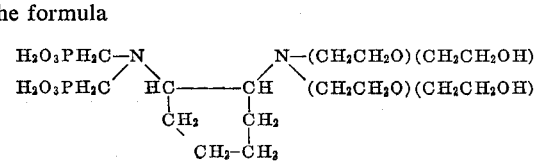

23. The method of claim 1 wherein said diamine has the formula
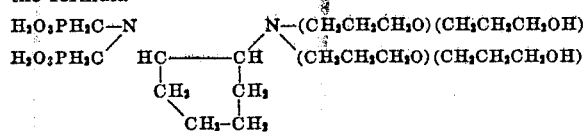
24. The method of claim 1 wherein said diamine has the formula
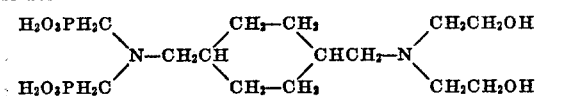
25. The method of claim 1 wherein said diamine has the formula
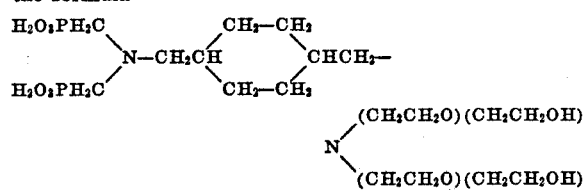
26. The method of claim 1 wherein said diamine has the formula
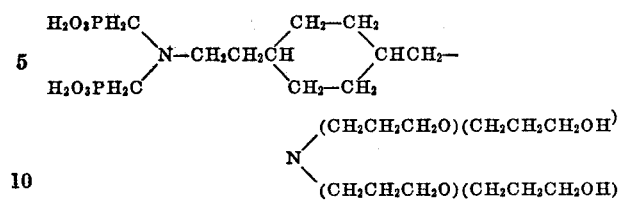
References Cited
UNITED STATES PATENTS
3,470,112   9/1969   Irani et al. _____ 260—502.5
3,718,603   2/1973   Mitchell _____ 260—502.5
LEON D. ROSDOL, Primary Examiner
J. WARE, Assistant Examiner
U.S. Cl. X.R.
210—58; 260—502.5